June 26, 1951   G. W. ASHLOCK, JR   2,558,205
CHERRY PITTER
Filed May 12, 1950   6 Sheets-Sheet 6

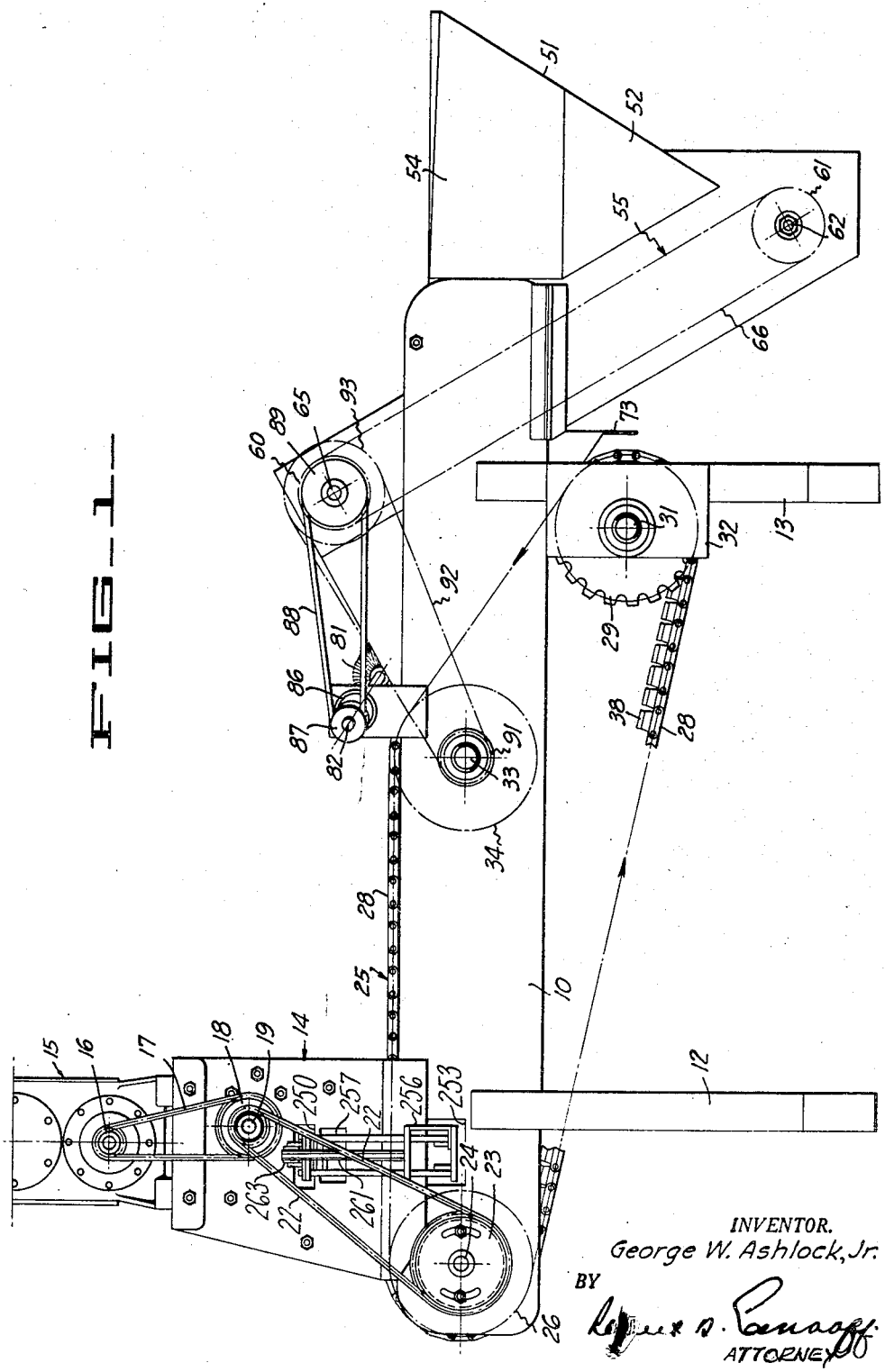

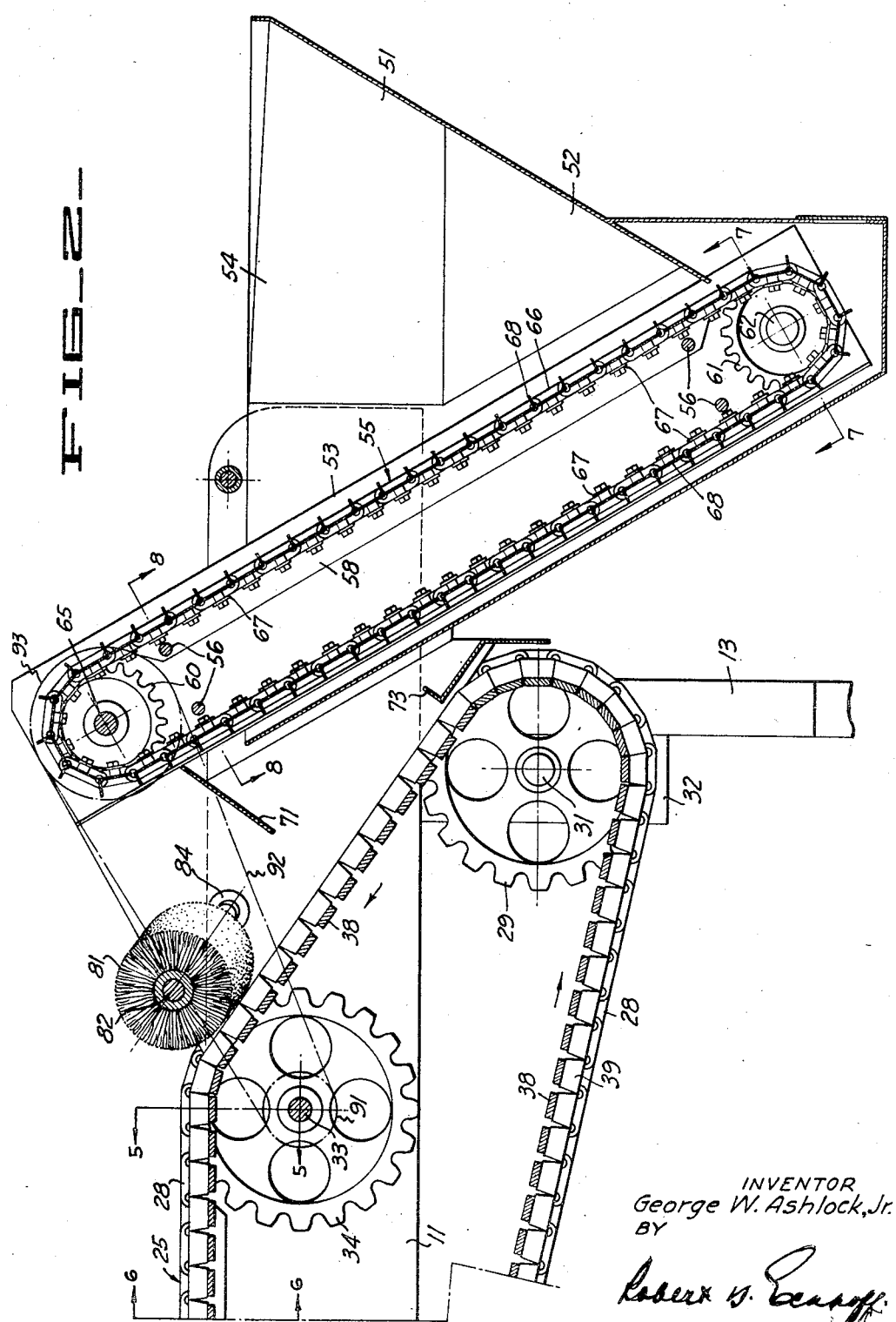

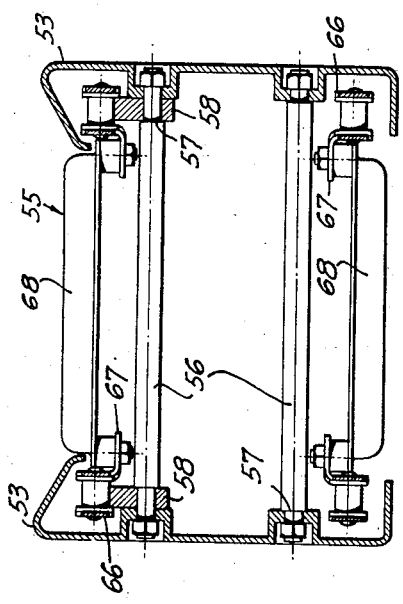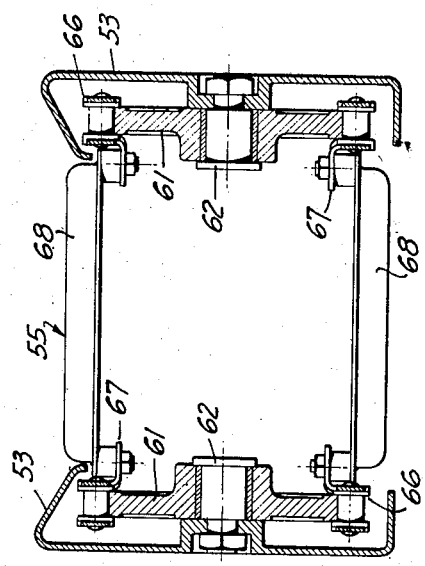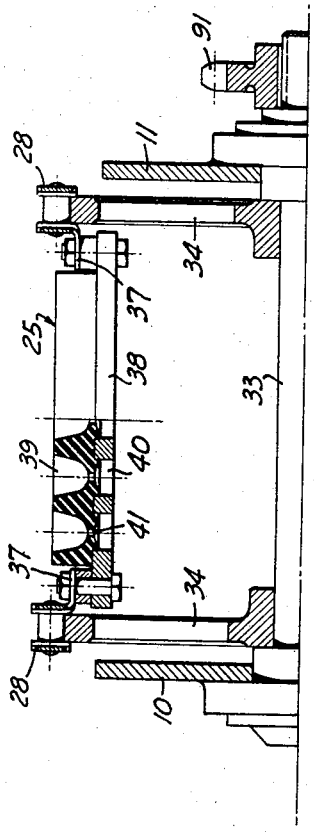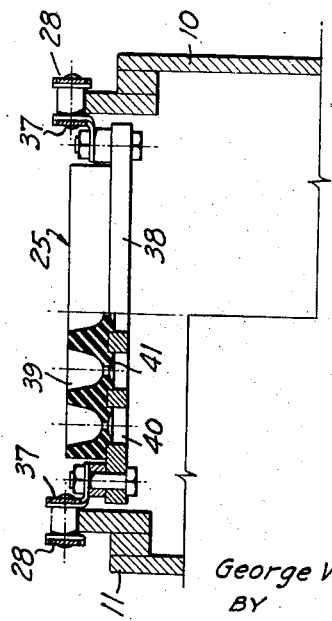

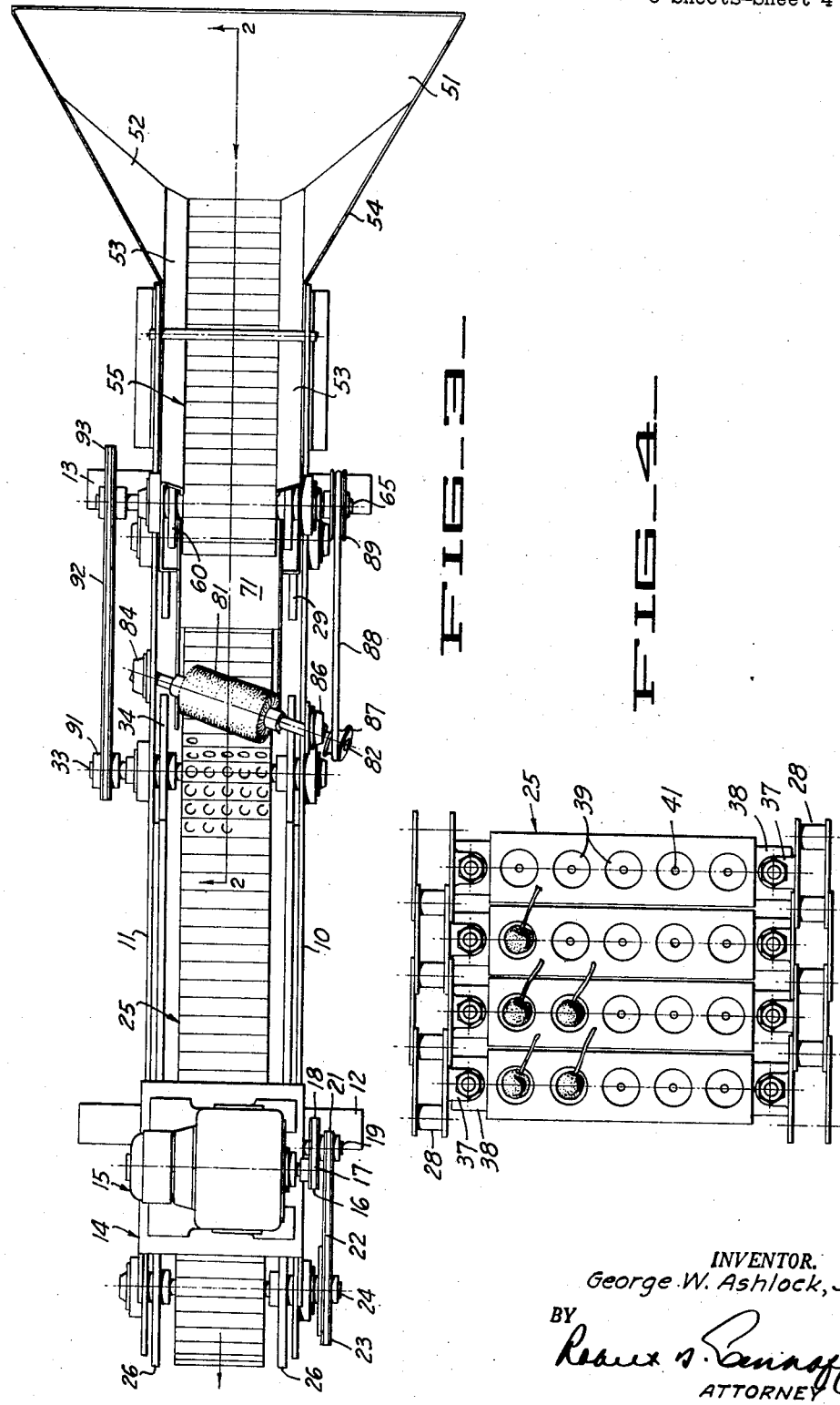

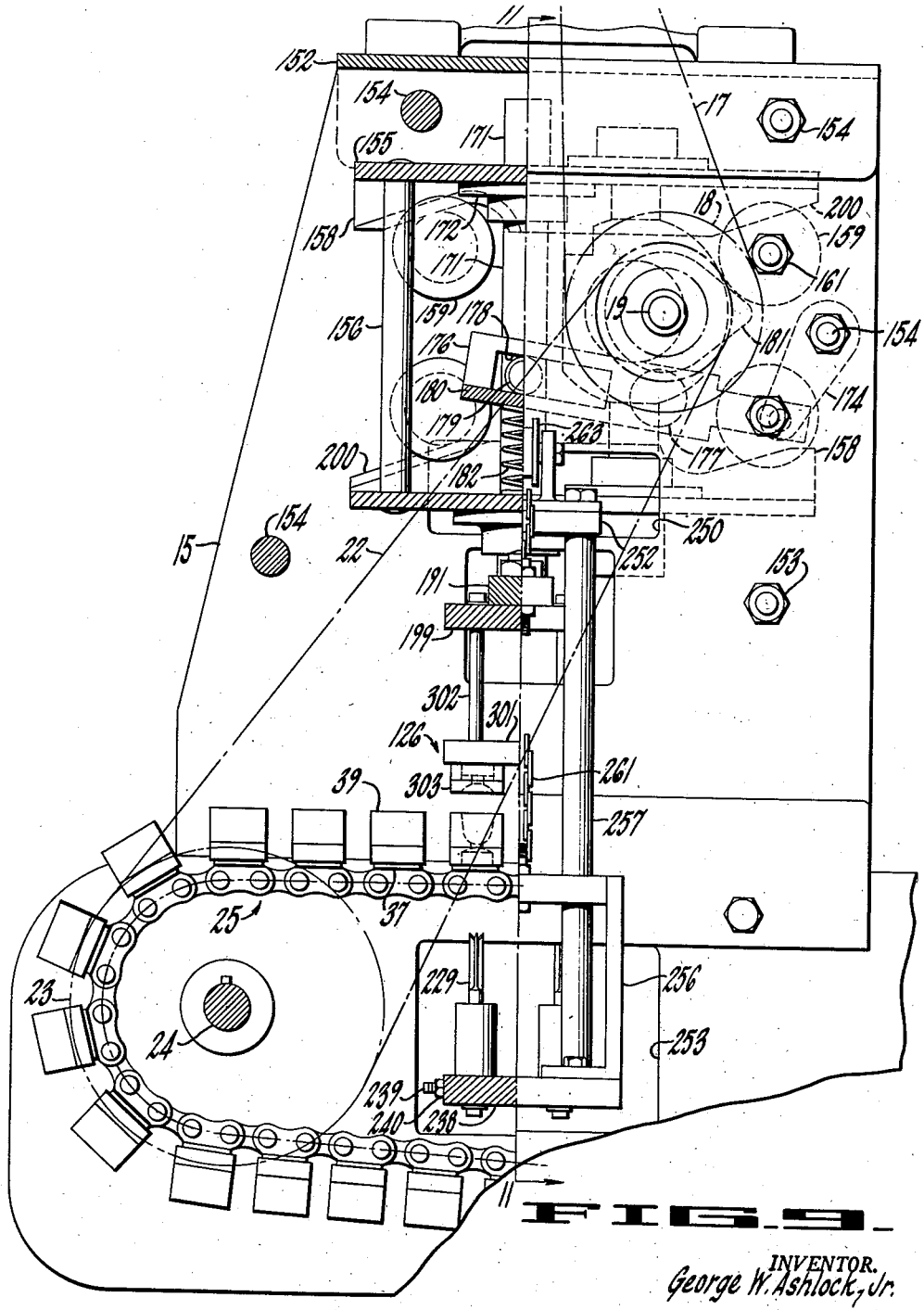

INVENTOR.
George W. Ashlock, Jr.
BY Robert N. Eckhoff
ATTORNEY

Patented June 26, 1951

2,558,205

UNITED STATES PATENT OFFICE 2,558,205

CHERRY PITTER

George W. Ashlock, Jr., Oakland, Calif.

Application May 12, 1950, Serial No. 161,653

6 Claims. (Cl. 146—19)

This is a continuation-in-part of my application Serial No. 767,772, filed August 9, 1947, now Patent 2,528,293.

This invention relates to the feeding of cherries having attached stems to a pitting mechanism whereby the cherries are positioned so that the stone in the cherry can be removed through the shoulder of the cherry and the attached stem does not interfere with the pitting operation.

Pitted cherries with stems attached are widely used. Heretofore, such cherries have been generally pitted by hand inasmuch as the presence of the stem made the handling of the cherry in any of the previously known cherry pitting machines impractical. In accordance with the present invention, the stemmed cherries are placed upon the pitting conveyor with the individual cherry stems extending in substantially the same direction, the cherries being supported on their sides so that, upon operation of the pitting mechanism, the stone of the cherry is removed through the side of the cherry, thus enabling the stem attachment to be continued and, at the same time, effecting only a minimum of cutting in the cherry so that its appearance is altered only very slightly.

The invention also contemplates provision of a novel feeding device and method for delivery of stemmed cherries to the pitting conveyor. Since the stemmed cherries are usually handled as a mass, preliminary segregation of the cherries into smaller masses is effected as the first step in proper placement of the cherries for pitting. After segregation, the several smaller masses are delivered successively to the pitting conveyor for placement thereon with their stems extending in such relation to the attached cherry that the stem does not interfere with the subsequent stone removal. While the pitting can be effected by such mechanism as that shown in my prior Patent 2,157,218 or 2,219,832, a novel pitting mechanism is hereinafter disclosed. This mechanism removes the pit through the shoulder of the cherry by piercing the cherry first adjacent its bottom and forcing the pit out through the shoulder. This manner of pitting results in a minimum bruising, distortion and cutting of the cherry flesh visible to a cherry consumer.

It is generally the broad object of the present invention to provide a novel machine and method for feeding cherries having attached stems to an automatic mechanism for removing the pits from the cherries.

A further object of the present invention is to provide a novel pitting device particularly suited to the pitting of cherries having attached stems.

The invention includes other objects and features of advantage, some of which, together with the foregoing, will appear hereinafter wherein the present preferred form of cherry feeder is disclosed in association with its related mechanism.

Referring to the drawings, Figure 1 is a side elevation of a machine embodying the present invention.

Figure 2 is a view taken along the line 2—2 of Figure 3.

Figure 3 is a plan view of the machine shown in Figure 1.

Figure 4 is an enlarged plan view showing cherries positioned for pitting after operation of the feeding mechanism.

Figures 5, 6, 7 and 8 are respectively figures taken along the lines 5—5, 6—6, 7—7, and 8—8 of Figure 2.

Figure 9 is a side elevation partly in section of a portion of the pitting mechanism.

Figure 10:
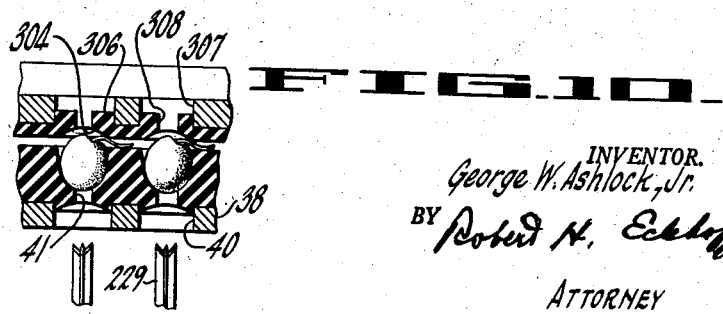

Figure 10 is a fragmentary view illustrating schematically the relation of certain portions of the pitting mechanism just prior to pitting of the fruit.

Figure 11:
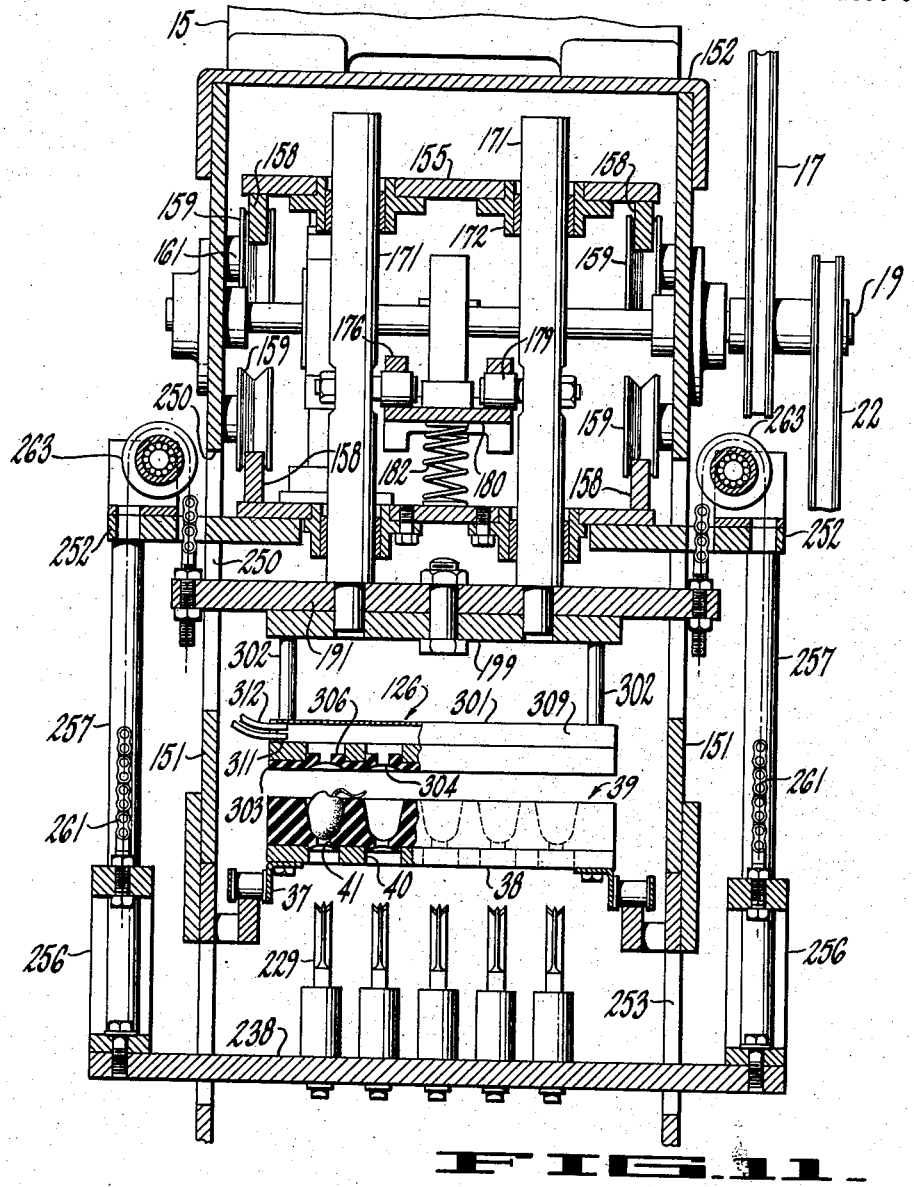

Figure 11 is a section along the line 11—11 in Figure 9.

Referring to the drawings, the machine of the present invention includes a pair of opposite vertical frame members 10 and 11, suitably secured together and supported by legs 12 and 13. A pitting mechanism, generally designated as 14, is mounted at one end of frame members 10 and 11, while the pitting mechanism can be that shown in my Patents 2,157,518 of May 9, 1939, and 2,219,832 of October 29, 1940, a novel pitting mechanism will be presently described in conjunction with Figures 1, 9, 10 and 11.

The drive

To drive the pitting mechanism and to operate the other units of the machine, a prime mover device, generally indicated at 15, is mounted upon the pitting mechanism.

The prime mover includes a sprocket 16 having a chain 17 trained thereover and about sprocket 18 on shaft 19 in the pitting mechanism. Another sprocket 21 is mounted upon shaft 19 and a chain 22 is extended about this sprocket and about sprocket 23 mounted upon pitting conveyor shaft 24 at the forward end of the machine and which is utilized to drive the carrier structure or pitting conveyor, generally indicated at 25.

The conveyor

To support the conveyor 25 and provide for a definite path of movement of the pitting conveyor, shaft 24 is suitably journaled in the side members 10 and 11 and carries sprockets 26, each of which is in mesh with the links of chains 28 which are extended about the sprockets 26. Sprockets 29 are mounted upon shaft 31, the latter being journaled suitably in plates 32 extending between frame members 10 and 11 and legs 13. A shaft 33 is also journaled between frame members 10 and 11 and includes sprockets 34 supporting the upper run of the chains 28. The rotation of the several sprockets is such that the conveyor chains 28 advance from sprockets 34 to sprockets 26 and then downwardly to sprockets 29 from which the chain passes upwardly at an acute angle to the horizontal to pass over sprockets 34 and thence on toward the pitting mechanism 14.

The several links comprising chains 28 include angle pieces 37 to which are secured plates 38 having apertures 40 therein. Each plate 38 includes suitable fruit pitting chucks 39, which appear in Figures 5 and 6; each of the chucks includes a recessed receptacle of generally circular cross-section and which has an aperture 41 in the bottom portion thereof over an aperture 40 in plate 38 through which the stone from the fruit can be ejected, if the fruit be pitted in accordance with my prior patents, or through which the knife is admitted if the fruit is pitted as is shown in Figures 9–11. The pitting conveyor can include any desired number of chucks in transverse alignment; one can refer to my prior Patents 2,209,305 and 2,314,862 and to my prior application Serial No. 109,547, filed August 10, 1949, now Patent 2,528,294, for an illustration of the construction of typical fruit pitting chucks and their attachment to the transverse plates 38 to make a suitable pitting conveyor. Generally, the receptacle or recess in each of the chucks should be of such depth that an intermediate portion of the stem of the cherry rests against the circular peripheral rim of the receptacle while the free end of the stem projects beyond such rim and only about a third of the cherry extends above the upper peripheral margin or rim of the receptacle. The chucks can be of rubber or of metal, as is desired.

The feed mechanism

To feed cherries onto the pitting conveyor 25, I provide a hopper 51 into which is placed cherries with their stems attached. The hopper includes side-walls 52 which form extensions of frame members 10 and 11, terminal portions 54 of which flare outwardly to form the hopper. The hopper includes parallel spaced guide walls 53 which form a part of the stemmed cherry separating and feed conveyor 55, as appears in Figure 8. The guide walls are spaced apart by threaded rods 56 extended between the two guide walls with shoulders 57 abutting conveyor support slides 58 (Figure 8). Mounted at each end of the guide walls 53 are sprockets 60 and 61, these being respectively mounted upon shaft 65 stub shafts 62 as appears in Figure 7. Chain 66 is trained about each of the sprockets 60 and 61 and over slides 58 on its upper run, the chain links including angle pieces 67 secured thereto. To each of the angle pieces are secured transverse L-shaped members 68 arranged one after the other to provide a series of ascending pockets defined by each L, the bottom of each L standing above the run of the conveyor and which pass through hopper 51 and pick up and carry along stemmed cherries. The conveyor 55 moves upwardly, finally passing over sprocket 60 at the upper end of the run of conveyor 55; at this point, the cherries carried by the conveyor 55 are discharged, falling down over the deflector plate 71 onto that portion of pitting conveyor 25 which is intermediate sprockets 29 and 34. Any cherries which fall until they are adjacent sprocket 29 are prevented from falling off the conveyor by stop 73. By utilizing L-shaped pockets in the feed conveyor 55, the cherries disentangle themselves from the mass of cherries in the hopper and are fed successively as a loose smaller mass. This disentanglement is further assisted by permitting the cherries to fall over the deflector plate 71 so that cherries are generally separated, one from the other, by the time they fall into place on pitting conveyor 25.

Cherry orientation

Feeding of the cherries to the pitting mechanism by the pitting conveyor 25 in other than a predetermined manner is prevented by brush 81 positioned cooperatively adjacent to the upper run of the conveyor 25 between sprockets 29 and 34. The brush 81 is positioned at an angle to the run of the conveyor and at an elevation such that it is effective to arrange the stems of the cherries at an angle to the run of the conveyor, as appears in Figure 4, and with the stem against the shoulder for a circular peripheral rim of the receptacle in which it is carried, as appears in Figures 10 and 11. To facilitate this mode of operation, shaft 82 supporting the brush 81 is angularly mounted with respect to conveyor 25 and is rotatably journaled in suitable bearings 84 and 86 provided upon side plates 10 and 11 of the machine. A sheave 87 is provided upon the extending end of shaft 82 and a V-belt 88 is trained about this and about a sheave 89 on shaft 65, the latter being driven from sheave 91 on shaft 33 by a chain 92 trained about the sprocket 91 and about a sprocket 93 on shaft 65.

By locating the shaft 82 at an acute angle to the run of the conveyor and in such relation to the surface of the conveyor that the brush just sweeps the stems rearwardly without disturbing the cherries, the distance between successive receptacles can be lessened while, at the same time, location and centering of the cherries in the several generally circular receptacles 39 on the pitting conveyor 25 is facilitated. Any cherries in excess of those required to provide single occupancy of each receptacle are forced back by the brush and into an oncoming open receptacle 39. In this manner occupancy of each of the receptacles by a stemmed cherry in the conveyor passing to the feeding mechanism is assured, as is the correct and desired orientation.

The pitting mechanism

The pitting conveyor 25 moves the cherries after orientation past the pitting mechanism 14. As has been set forth, this mechanism can be that set forth in my prior Patents 2,219,832 and 2,157,218 and wherein a knife is advanced in the direction of advance of the conveyor and downwardly in such fashion that, in effect, the knife penetrates the fruit at 90° to the conveyor through the shoulder area, forcing the engaged stone from the fruit through a bottom area. With the fruit on its side, this is satisfactory because it does not interfere with, nor sever, the stem attachment. However, a more satisfactory operation and a fruit of improved appearance is provided if fruit is pitted in such fashion that the pit is forced from the fruit through the shoulder. This is achieved by the mechanism of Figures 9 through 11.

The pitting mechanism reciprocating means employed is that generally disclosed in my Patent 2,219,832, which includes opposite parallel vertically extending side members 151 supported on frame members 10 and 11 and joined together by the member 152 and threaded rods 154 extending through each side member 151 and secured thereto by nuts 153. Between the side plates is a pitting knife or plunger head structure which includes horizontal parallel plates 155 secured together in a spaced relation by spacers 156. Each plate 155 carries V-block 158 on opposite sides thereof and having angularly formed V-sections 200 on which roll the V-rollers 159. A stud 161 supports each roller on a side member 151. The V-blocks and V-rollers thus support the head structures provided by plates 155 for a reciprocating movement over the plane of the conveyor 25 and, at the same time, for an up-and-down movement, so that the head structure moves toward and away from the horizontal plane of the carrier structure 10.

Means are provided on the head structure for operating a pitting or plunger mechanism and a clamping mechanism in a coordinated manner. This includes the plungers 171 suitably journaled in bearings 172 on plates 155. Fixed arms 174 are mounted upon one of the rods 154 and extend to provide a support for the spaced levers 176 between which is mounted a cam follower 177. The extending end of each lever 176 is slotted as at 178 to engage a roller 179 carried upon each plunger 171. The cam follower 177 is maintained in engagement with a cam 181 carried on shaft 19 by a spring 182 pushing on pad 180 joining the levers 176. The spring urges the levers 176 clockwise in Figure 9 so that the cam follower engages the cam at all times.

A plate 191 is mounted upon the extending ends of the plungers 171 and extends transversely across the machine. It carries a plate 199 which supports a plurality of fruit clamps indicated generally at 126. These clamps are arranged in one or more rows across the plate 199 cooperatively with respect to the presently described pitting knives 229, the clamps being provided to retain each fruit in a holder during pitting by a knife, as will be disclosed. The fruit clamp 126 includes a transverse plate 301 supported on posts 302 from plate 191. The plate has a rubber facing plate 303 thereon having a cooperative indentation 304 therein to fit on a cherry top and hold it in place during pitting. The facing plate 303 has an extension 306 fitting in a cooperative aperture 307 in the facing plate and having a passage 308 to pass a cherry stone. On its upper side the plate 301 includes side plates 309 and nozzles 311 connected by flexible conduits 312 to a source of high pressure air, water or other fluid, a sheet metal drain chute is provided on a side of the machine to drain off pits moved off the plate by the fluid stream from the nozzles 311, the chute being omitted for convenience of illustration.

A plurality of pitting knives 229 are mounted in plate structure 238 which extends across the machine, preferably, two rows of knives being employed. Each of the knives 229 is retained in apertures in the plate 238 by a stud 239 and lock nut 240.

The pitting knives are moved by the following structure: The machine side frame plates 151 are suitably apertured as at 250 to pass extension plates 252 secured to the lower plate 155 and which extend to the outside of the machine. Frame members 10 and 11 are also apertured as at 253 to permit plate 238 to extend across the machine. Two rods 257 are secured on each side of the machine to plates 252. Plate 238 is removably mounted in a frame 256 which is mounted for sliding on the rods 257. It will be apparent that the knives follow the movement of the pitting head plate 155 and move with this plate at the same rate of advance with the conveyor, since they are formed as an extension on the pitting head plate 155.

To provide for movement of the knives, chains 261 are secured to each side of plates 191 and are then passed over guide pulleys 263 and depend downwardly to the knife reciprocating frame 256 which is mounted for a reciprocating movement on the guide rods 257.

The operation of the pitting mechanism portion of the machine will become further apparent upon considering the following sequence of operation, particularly in connection with Figure 10. The description will be made as the machine is operated continuously. However, it is to be understood that it can be operated sequentially if desired, that is, instead of moving the orienting and pitting mechanisms and the conveyor structure 10 continuously, the conveyor structure 10 can be moved to a pitting position and brought to rest, the stoning and pit-removing mechanism operated, whereupon the conveyor mechanism is advanced. However, this sequential operation is not nearly so fast and continuous operation is usually preferred.

It being understood that shaft 19 is rotated at a suitable speed, and that conveyor 10 is being operated in a timed relationship therewith, and that each receptacle 39 contains fruit in alignment, the fruit is advanced to the fruit pitting station as appears in Figures 9–11. Referring to these figures, it will be noted that in Figures 9 and 11, the pitting plunger is shown approaching the fruit in the receptacle but that the fruit has not been cut while the fruit clamp is poised in a spaced relation over the fruit. As the movement continues, the fruit clamp engages and holds two rows of the fruit in position. In Figure 10, I have shown the knife and clamp just prior to engagement with the fruit of the clamp and then the knife. The rubber covered clamp does not harm the attached stem even though it and the fruit are firmly held. With the fruit securely held, the knife forces the pit up through the fruit, the clamp and onto the transverse plate where the pit is blown or washed away by the fluid from the jet-nozzles. Each cherry is pitted by being cut first on the bottom and finally at the shoulder; by forcing the stone through the shoulder. This results in a minimum of visually apparent damage to the fruit when the fruit is viewed, as it is normally, with the stem end away from the observer.

I claim:

1. A machine for pitting cherries having attached stems comprising a conveyor movable over a path and including a plurality of cherry support chucks arranged serially of said conveyor, each chuck having a resilient cherry support receptacle recessed therein from a face on said chuck, each receptacle being of a depth approximating the diameter of a cherry and being disposed substantially symmetrically about an axis extending substantially at 90° to the face of said chuck and having a continuous circular peripheral rim whose inner circumference is substantially equal to that of a cherry being pitted but of sufficient magnitude to enable a cherry to be placed with ease into said receptacle, pitting mechanism provided at a first station along said path and movable along said axis to force a stone from a cherry in each resilient receptacle moved past the pitting mechanism, means for depositing cherries having attached stems on said conveyor at a second station in advance of the first station in the direction of movement of the conveyor, a brush supported for rotation intermediate said stations and at an angle to the path of said conveyor and cooperatively adjacent to the conveyor, means for rotating the brush in a direction opposite to the direction of advance of the conveyor in turn each cherry in a receptacle until a portion of the stem intermediate the ends of the stem is in engagement with said rim and said stem extends upwardly from the receptacle at an angle to said axis and in a spaced relation to said axis to support the cherry stably in said receptacle with bottom and underside portions of the cherry engaged with the receptacle for pitting by said pitting mechanism with the stem attachment spaced from said axis a distance sufficient to ensure pit removal from the cherry by said pitting mechanism without severing of the stem attachment by said pitting mechanism, said pitting mechanism further including a second and complementary receptacle section having a rim engageable with the rim of the first mentioned receptacle, and means for movably mounting the first mentioned receptacle and the second and complementary receptacle section for relative movement to clamp the stem eccentrically relative to the axis of the receptacle during pitting.

2. A machine for pitting cherries having attached stems comprising a conveyor movable over a path and including a plurality of cherry support chucks arranged serially of said conveyor, each chuck having a resilient cherry support receptable recessed therein from a face on said chuck, each receptacle being of a depth approximating the diameter of a cherry and being disposed substantially symmetrically about an axis extending substantially at 90° to the face of said chuck and having a continuous circular peripheral rim whose inner circumference is substantially equal to that of a cherry being pitted but of sufficient magnitude to enable a cherry to be placed with ease into said receptacle, pitting mechanism provided at a first station along said path and movable along said axis to force a stone from a cherry in each resilient receptacle moved past the pitting mechanism, means for depositing cherries having attached stem on said conveyor at a second station in advance of the first station in the direction of movement of the conveyor, a brush supported for rotation intermediate said stations and at an angle to the path of said conveyor and cooperatively adjacent to the conveyor, means for rotating the brush in a direction opposite to the direction of advance of the conveyor to turn each cherry in a receptacle until a portion of the stem intermediate the ends of the stem is in engagement with said rim and said stem extends upwardly from the receptacle at an angle to said axis and in a spaced relation to said axis to support the cherry stably in said receptacle with a bottom and an underside portion of the cherry engaged with the receptacle for pitting by said pitting mechanism with the stem attachment spaced from said axis a distance sufficient to ensure pit removal from the cherry by said pitting mechanism without severing of the stem attachment by said pitting mechanism, said pitting mechanism further including a means mounted above the receptacle and engageable with a cherry in the receptacle, and means for mounting the last-named means and the receptacle for relative movement to clamp the cherry in the receptacle eccentrically relative to the axis of the fruit during pitting.

3. A machine for pitting cherries having attached stems comprising a conveyor movable over a path and including a plurality of cherry support chucks arranged serially of said conveyor, each chuck having a resilient cherry support receptable recessed therein from a face on said chuck, each receptacle being of a depth approximating the diameter of a cherry and being disposed substantially symmetrically about an axis extending substantially at 90° to the face of said chuck and having a continuous circular peripheral rim whose inner circumference is substantially equal to that of a cherry being pitted but of sufficient magnitude to enable a cherry to be placed with ease into said receptacle, pitting mechanism provided at a first station along said path and movable along said axis to force a stone from a cherry in each resilient receptacle moved past the pitting mechanism, means for depositing cherries having attached stems on said conveyor at a second station in advance of the first station in the direction of movement of the conveyor, a brush supported for rotation intermediate said stations and cooperatively adjacent to the conveyor, means for rotating the brush in a direction opposite to the direction of advance of the conveyor to turn each cherry in a receptacle until a portion of the stem intermediate the ends of the stem is in engagement with said rim and said stem extends upwardly from the receptacle at an angle to said axis and in a spaced relation to said axis to support the cherry stably in said receptacle with a bottom and an underside portion of the cherry engaged with the receptacle for pitting by said pitting mechanism with the stem attachment spaced from said axis a distance sufficient to ensure pit removal from the cherry by said pitting mechanism without severing of the stem attachment by said pitting mechanism, and means movably mounted in a superimposed position over said receptacle and movable along said knife to engage the stem on the cherry and hold the stem out of alignment with said axis during pitting by said knife.

4. A machine for pitting cherries having attached stems comprising a conveyor movable over a path and including a plurality of cherry support chucks arranged serially of said conveyor, each chuck having a resilient cherry support receptacle recessed therein from a face on said chuck, each receptacle being of a depth such that less than a third of a cherry in said receptacle extends above said face, said receptacle being disposed substantially symmetrically about an axis extending substantially at 90° to the face of said chuck and having a continuous circular peripheral rim whose inner circumference is substantially equal to that of a cherry being pitted but of sufficient magnitude to enable a cherry to be placed with ease into said receptacle, pitting mechanism provided at a first station along said path and movable along said axis to force a stone from a cherry in each resilient receptacle moved past the pitting mechanism, means for depositing cherries having attached stems on said conveyor at a second station in advance of the first station in the direction of movement of the conveyor, a brush supported for rotation intermediate said stations and at an angle to the path of said conveyor and cooperatively adjacent to the conveyor, means for rotating the brush in a direction opposite to the direction of advance of the conveyor to turn each cherry in a receptacle until a portion of the stem intermediate the ends of the stem is in engagement with said rim and said stem extends upwardly from the receptacle at an angle to said axis and in a spaced relation to said axis to support the cherry stably in said receptacle with bottom and underside portions of the cherry engaged with the receptacle for pitting by said pitting mechanism with the stem attachment spaced from said axis a distance sufficient to ensure pit removal from the cherry by said pitting mechanism without severing of the stem attachment by said pitting mechanism, said pitting mechanism further including a second and complementary receptacle section having a rim engageable with the rim of the first receptacle, and means for movably mounting the receptacle and complementary receptacle section for relative movement to clamp the stem eccentrically relative to the axis of the receptacle during pitting.

5. A machine for pitting cherries having attached stems comprising a conveyor movable over a path and including a plurality of cherry support chucks arranged serially of said conveyor, each chuck having a resilient cherry support receptacle recessed therein from a face on said chuck, each receptacle being of a depth and that not more than a third of a cherry in said receptacle extends above said face, said receptacle being disposed substantially symmetrically about an axis extending substantially at 90° to the face of said chuck and having a continuous circular peripheral rim whose inner circumference is substantially equal to that of a cherry being pitted but of sufficient magnitude to enable a cherry to be placed with ease into said receptacle, pitting mechanism provided at a first station along said path and movable along said axis to force a stone from a cherry in each resilient receptacle moved past the pitting mechanism, means for depositing said cherries on said conveyor at a second station in advance of the first station in the direction of movement of the conveyor, a brush supported for rotation intermediate said stations and at an angle to the path of said conveyor and cooperatively adjacent to the conveyor, means for rotating the brush in a direction opposite to the direction of advance of the conveyor to turn each cherry in a receptacle until a portion of the stem intermediate the ends of the stem is in engagement with said rim and said stem extends upwardly from the receptacle at an angle to said axis and in a spaced relation to said axis to support the cherry stably in said receptacle with a bottom and an underside portion of the cherry engaged with the receptacle for pitting by said pitting mechanism with the stem attachment spaced from said axis a distance sufficient to ensure pit removal from the cherry by said pitting mechanism without severing of the stem attachment by said pitting mechanism, said pitting mechanism further including a means mounted above the receptacle and engageable with a cherry in the receptacle, and means for mounting the last-named means and the receptacle for relative movement to clamp a cherry in the receptacle eccentrically relative to the axis of the fruit during pitting.

6. A machine for pitting cherries having attached stems comprising a conveyor movable over a path and including a plurality of cherry support chucks arranged serially of said conveyor, each chuck having a resilient cherry support receptacle recessed therein from a face on said chuck, each receptacle being of a depth such that not more than a third of a cherry in a receptacle extends from the receptacle above said face, each receptacle being disposed substantially symmetrically about an axis extending substantially at 90° to the face of said chuck and having a continuous circular peripheral rim whose inner circumference is substantially equal to that of a cherry being pitted but of sufficient magnitude to enable a cherry to be placed with ease into said receptacle, pitting mechanism provided at a first station along said path and movable along said axis to force a stone from a cherry in each resilient receptcle moved past the pitting mechanism, means for depositing said cherries on said conveyor at a second station in advance of the first station in the direction of movement of the conveyor, a brush supported for rotation intermediate said stations and cooperatively adjacent to the conveyor, means for rotating the brush in a direction opposite to the direction of advance of the conveyor to turn each cherry in a receptcle until a portion of the stem intermediate the ends of the stem is in engagement with said rim and said stem extends upwardly from the receptacle at an angle to said axis and in a spaced relation to said axis to support the cherry stably in said receptacle in a position wherein a bottom and an underside portion of the cherry are engaged with the receptacle for pitting by said pitting mechanism with the stem attachment spaced from said axis a distance sufficient to ensure pit removal from the cherry by said pitting mechanism without severing of the stem attachment by said pitting mechanism, and means movably mounted in a superimposed position over said receptacle and movable along said knife to engage the cherry and hold the cherry in said position and the stem out of alignment with said axis during pitting by said knife.

GEORGE W. ASHLOCK, Jr.

REFERENCES CITED

The following references are of record in the file of this patent:

UNITED STATES PATENTS

| Number | Name | Date |
|---|---|---|
| 687,022 | Harris | Nov. 19, 1901 |
| 1,742,653 | Goranson et al. | Jan. 7, 1930 |
| 2,059,163 | Wolff | Oct. 27, 1936 |
| 2,157,518 | Ashlock, Jr. | May 9, 1939 |
| 2,209,305 | Ashlock, Jr. | July 30, 1940 |
| 2,219,832 | Ashlock, Jr. | Oct. 29, 1940 |
| 2,243,530 | Kok | May 27, 1941 |
| 2,293,121 | Dudley, Jr. | Aug. 28, 1942 |
| 2,314,862 | Ashlock, Jr. | Mar. 30, 1943 |
| 2,356,977 | Coons | Aug. 29, 1944 |
| 2,415,418 | Coons | Feb. 11, 1947 |
| 2,528,293 | Ashlock | Oct. 31, 1950 |
| 2,528,294 | Ashlock, Jr. | Oct. 31, 1950 |

FOREIGN PATENTS

| Number | Country | Date |
|---|---|---|
| 625,009 | France | Apr. 16, 1927 |